US012752581B2

(12) United States Patent
Bechtel et al.

(10) Patent No.: US 12,752,581 B2
(45) Date of Patent: Oct. 6, 2026

(54) LENGTH SENSING TETHER BAR SYSTEM FOR SELF PROPELLED TRAILER SYSTEMS

(71) Applicant: FCA US LLC, Auburn Hills, MI (US)

(72) Inventors: Travis D Bechtel, Goodrich, MI (US); Mark E Stout, II, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 151 days.

(21) Appl. No.: 18/679,794

(22) Filed: May 31, 2024

(65) Prior Publication Data

US 2024/0317003 A1 Sep. 26, 2024

Related U.S. Application Data

(63) Continuation-in-part of application No. 18/190,588, filed on Mar. 27, 2023, now Pat. No. 12,600,182, and a continuation-in-part of application No. 18/308,836, filed on Apr. 28, 2023.

(60) Provisional application No. 63/423,218, filed on Nov. 7, 2022.

(51) Int. Cl.

*G08B 21/00* (2006.01)
*B60D 1/155* (2006.01)
*B60D 1/58* (2006.01)

(52) U.S. Cl.

CPC ............... *B60D 1/58* (2013.01); *B60D 1/155* (2013.01)

(58) Field of Classification Search

CPC . B60D 1/58; B60D 1/155; B60D 1/30; B60D 1/62
USPC ........................................................ 340/431
See application file for complete search history.

(56) References Cited

U.S. PATENT DOCUMENTS

| | | | | |
|---|---|---|---|---|
| 4,817,978 A * | 4/1989 | James | B60D 1/50 | 280/487 |
| 8,905,424 B2 * | 12/2014 | Williams, Jr. | B60D 1/50 | 280/479.1 |
| 2012/0193154 A1 * | 8/2012 | Wellborn | B60W 10/20 | 180/14.2 |
| 2013/0079979 A1 * | 3/2013 | Sheidler | B62D 59/04 | 180/14.2 |
| 2014/0005918 A1 * | 1/2014 | Qiang | B60D 1/245 | 701/300 |
| 2019/0064795 A1 * | 2/2019 | Berggren | B60D 1/44 | |
| 2021/0070357 A1 * | 3/2021 | Niewiadomski | B60W 10/20 | |
| 2022/0126714 A1 | 4/2022 | Bucknor et al. | | |

* cited by examiner

*Primary Examiner* — Mark S Rushing
(74) *Attorney, Agent, or Firm* — Jeremy J. Klobucar

(57) ABSTRACT

A tow bar system for an independently steered and powered trailer vehicle includes a length sensing hitch having a first end configured to removably couple to a hitch of a lead vehicle, and an opposite second end configured to removably couple to a hitch of the trailer vehicle. A free sliding bar is disposed between the first and second ends and configured to allow extension and compression of the length sensing hitch. A length sensor is operably associated with the free sliding bar and configured to sense a length of the tow bar system.

19 Claims, 8 Drawing Sheets

LENGTH SENSING TETHER BAR SYSTEM FOR SELF PROPELLED TRAILER SYSTEMS

CROSS-REFERENCE TO RELATED APPLICATION

This application is continuation-in-part of U.S. patent application Ser. No. 18/190,588, filed on Mar. 27, 2023 and U.S. patent application Ser. No. 18/308,836, filed on Apr. 28, 2023, each of which claims the benefit of U.S. Provisional Pat. App. No. 63/423,218 filed Nov. 7, 2022, the contents of which are incorporated herein by reference thereto.

FIELD

The present application relates generally to vehicle trailer systems and, more particularly, to a tether bar system for self-propelled vehicle trailer systems.

BACKGROUND

Conventional towing/hitch systems transfer load from the trailer to the rear of lead vehicle, thus requiring the lead vehicle to have a payload carrying capability proportional to the trailer weight. Additionally, the towing/hitch systems can potentially induce undesirable forces to the lead vehicle that can potentially destabilize the forward motion of the lead vehicle (sway) or impart harsh impacts/noises into the lead vehicle chassis under acceleration and deceleration conditions. Accordingly, while such conventional systems work well for their intended purpose, there is a desire for improvement in the relevant art.

SUMMARY

In accordance with an example aspect of the invention, a tow bar system for an independently steered and powered trailer vehicle is provided. In one example implementation, the tow bar system includes a length sensing hitch having a first end configured to removably couple to a hitch of a lead vehicle, and an opposite second end configured to removably couple to a hitch of the trailer vehicle. A free sliding bar is disposed between the first and second ends and configured to allow extension and compression of the length sensing hitch. A length sensor is operably associated with the free sliding bar and configured to sense a length of the tow bar system.

In addition to the foregoing, the described tow bar system may include one or more of the following features: wherein the length sensor is configured for signal communication with a multi-vehicle control system (MVCS) of the lead vehicle and/or the trailer vehicle; an angle sensor disposed on the first end and configured to sense an angle between the lead vehicle and the first end, wherein the angle sensor is in signal communication with the MVCS; an angle sensor disposed on the second end and configured to sense an angle between the trailer vehicle and the second end, wherein the angle sensor is in signal communication with the MVCS; and a load cell configured to sense one or more forces on the tow bar system, wherein the load cell is in signal communication with the MVCS.

In addition to the foregoing, the described tow bar system may include one or more of the following features: a damper system disposed between the first end and the second end and configured to absorb compressive and tensile loads occurring during steering, accelerating, and braking of the independently steered and powered trailer vehicle; wherein the damper system includes a damper, a front support coupled between a front tow bar and the damper, and a rear support coupled between a rear tow bar and the damper; wherein the damper system further includes a front biasing mechanism positioned within the front support between the front tow bar and the damper and a rear biasing mechanism positioned within the rear support between the rear tow bar and the damper; wherein the front biasing mechanism is an extension spring, and the rear biasing mechanism is a compression spring; and a horizontal lockout assembly configured to lock out a lateral steering degree of freedom at the first or second end of the tow bar system.

In accordance with another example aspect of the invention, a multi-vehicle control system (MVCS) for dynamic stability and control of a multi-vehicle system having a lead vehicle and a trailer vehicle each with independent propulsion and control is provided. In one example, the MVCS includes a tow bar system having a length sensing hitch having a first end configured to removably couple to a hitch of a lead vehicle, and an opposite second end configured to removably couple to a hitch of the trailer vehicle, a free sliding bar disposed between the first and second ends and configured to allow extension and compression of the length sensing hitch, and a length sensor operably associated with the free sliding bar and configured to sense a length of the tow bar system. A controller is in signal communication with the lead vehicle and a trailer vehicle advanced driver assistance system (ADAS) or autonomous driving system. The controller is programmed to monitor and receive signals from the length sensor indicating a length of the tow bar system, and modify a throttle and a braking of the trailer vehicle, based on the received signals from the length sensor, to dynamically stabilize the multi-vehicle system.

In addition to the foregoing, the described MVCS may include one or more of the following features: wherein the controller is further programmed to determine an acceleration rate of change based on the received signals from the length sensor; wherein the controller determines the acceleration rate of change based on the sensed length of the tow bar system at three points in time; wherein the controller is further programmed to determine if the lead vehicle is accelerating or decelerating based on the received signals from the length sensor; and wherein the controller is further programmed to determine if an acceleration or deceleration of the trailer vehicle matches the determined lead vehicle acceleration or deceleration.

In addition to the foregoing, the described MVCS may include one or more of the following features: wherein the controller is further programmed to adjust a speed of the trailer vehicle if the acceleration or deceleration of the trailer vehicle does not match the determined lead vehicle acceleration or deceleration, to thereby match the trailer vehicle acceleration or deceleration to the lead vehicle acceleration or deceleration; wherein the controller is further programmed to maintain a speed and direction of the trailer vehicle if the acceleration or deceleration of the trailer vehicle matches the determined lead vehicle acceleration or deceleration; and wherein the tow bar system further includes an angle sensor disposed on the first end and configured to sense an angle between the lead vehicle and the first end, wherein the angle sensor is in signal communication with the controller.

In addition to the foregoing, the described MVCS may include one or more of the following features: wherein the tow bar system further includes an angle sensor disposed on the second end and configured to sense an angle between the trailer vehicle and the second end, wherein the angle sensor is in signal communication with the controller; and wherein the tow bar system further includes a load cell configured to sense one or more forces on the tow bar system, wherein the load cell is in signal communication with the controller.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
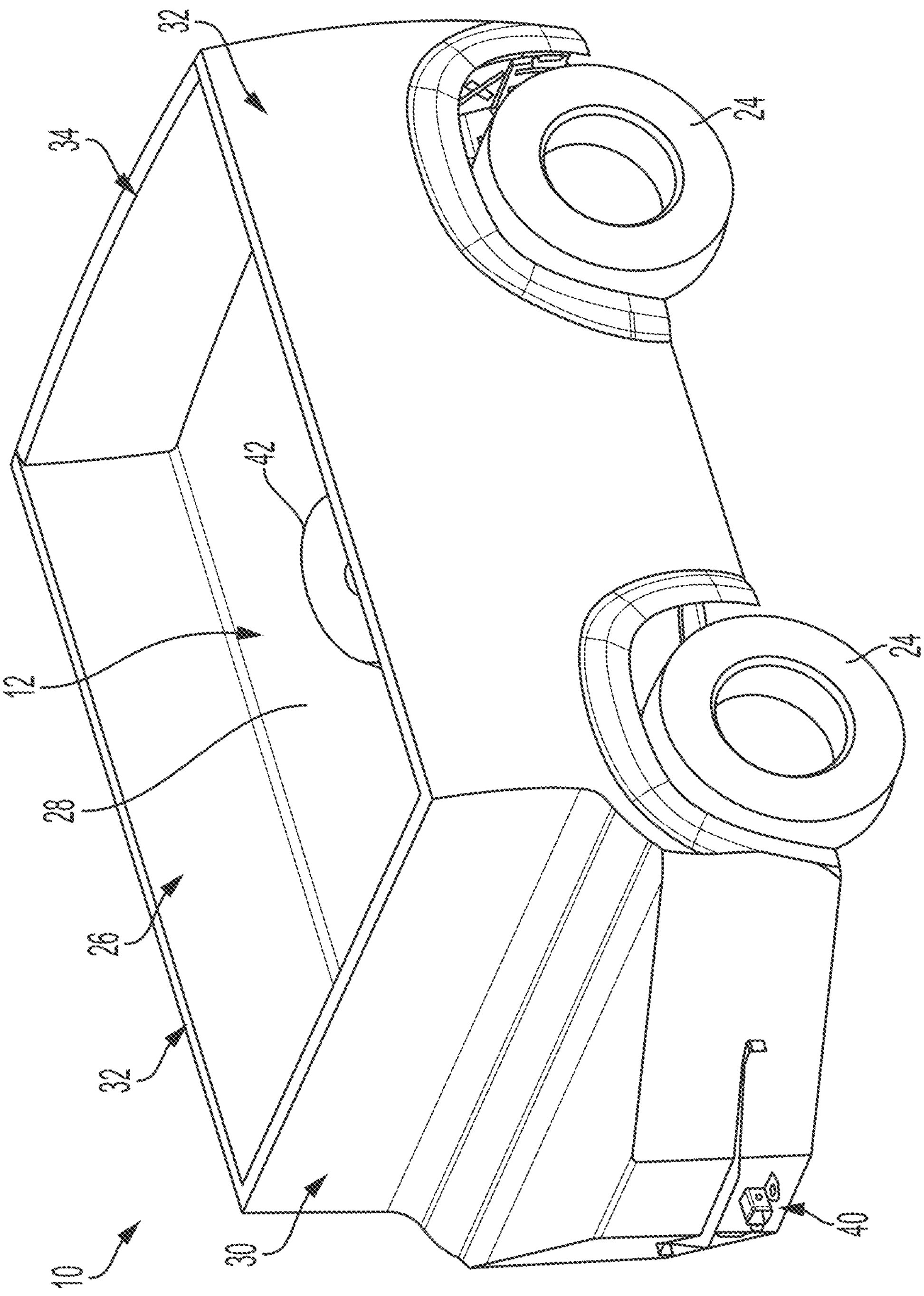
FIG. 1 is a perspective view of an example dolly platform system with independent propulsion and control, in accordance with the principles of the present application.

Described herein are control systems for multi-vehicle systems that include a lead vehicle and a self-propelled, battery electric vehicle (BEV) based trailer system. The BEV trailers may be, for example, a wagon style (e.g., wheels at four corners) or traditional chassis trailer with a steerable axle such as those shown in FIGS. 1-4. Additionally, the BEV trailers utilize a tow bar system such as that shown and described in FIGS. 5-8. In one particular embodiment, shown in FIG. 8, the BEV trailers utilize a length sensing tow bar system.

As described herein in more detail, the length sensing tow bar system, also referred to as a tether bar system, is configured to provide a length sensing capability for independently steered and powered vehicles. Example features of the tow bar system include: (i) a degree of freedom connection at both ends of the tow bar to allow articulation between the two vehicles, (ii) a free sliding mechanism allowing length changes between the vehicle connections within a defined minimum and maximum distance between the lead and follow vehicles, (iii) a means of sensing the extended length of the tow bar to provide distance and derivative (e.g., velocity and/or acceleration rate of change) status information to the vehicle systems, (iv) a means to absorb harsh compressive loads if the tether is allowed to reach its fully compressed length, (v) a means to absorb harsh tensile loads if the tether is allowed to reach its fully extended length, (vi) a means to support and route an electrical cable connection between the lead and follow vehicles, (vii) a means to sense an angular difference between the tether bar and both lead and follow vehicles, and (viii) a means of relaying the previously described information to one or more electronic control units (ECUs) contained in the lead and/or trailer vehicle for the execution of various towing maneuvers.

In one example, the sliding tow bar system provides a physical linkage between two vehicles that have the independent ability to accelerate/decelerate fore/aft via human or autonomous control, and steer laterally via human or autonomous driving control. The system provides additional degrees of freedom as a link between the two vehicles to allow improved articulation between the leading and following vehicles. The sliding tow bar allows a free sliding length of travel to sense the distance between the lead and follow vehicles, which is then utilized as an input for the paired vehicle dynamic control system.

The sliding tow bar system may not support vertical loading between the two vehicles, so weight is not transferred therebetween which would otherwise potentially affect the handling of the vehicles individually or as a pair. Further, under normal operating conditions, the tow bar system does not transfer lateral moment loading between the two vehicles, which eliminates the possibility of the following vehicle imparting trailer sway to the lead vehicle. Such features will also allow the lead and follow vehicles to maintain an offset within the lane width when it may be advantageous for crosswind drag or visibility in outside.

As such, the tow bar system enables vehicles that may be mismatched in terms of turning radius (e.g., due to differences in wheelbase) to follow in a best fit path via independent physical, but electronically linked steering, acceleration, and braking controls. Additional features include means of notifying the driver of the lead vehicle that they are exceeding a maximum turning angle of their trailer, which would result in a jackknife condition, but one that the driver could override if they so choose.

The described tow bar system provides several benefits compared to a conventional trailer attachment. First, the combination of spherical joints at each end and free sliding travel for connection eliminates the need for precise parking of the tow vehicle in relation to the trailer and for jacking or height adjustments to connect the vehicles. Second, a working distance of free sliding travel facilitates tight, low speed maneuvers where the turning radius of the lead and trail vehicles is mismatched, or there is a desired path difference due to the direction of travel and the steering axle location.

Third, the mechanical connections to the vehicles can be made within the range of free sliding constraints of the tow bar, establishing a mechanical limit of the minimum and maximum distance between the two vehicles. The functional distance between the two vehicles (target length of the sliding tether while in motion) will be set by the paired vehicle control system's operating parameters and will be varied based on conditions including, but not limited to; ground speed, radius of turning maneuver in process, lane bias selection, road load work sharing while accelerating, braking, or traveling at a matched speed. The operating position and resulting amount of free travel may be useful in (i) allowing for some compression travel within the tow bar, which allows for some response latency between the lead vehicle initiating a braking event before the following vehicle can respond precisely, and (ii) allowing for some extension travel within the tow bar, which allows for some response latency between the lead vehicle initiating an acceleration high angle turning event before the following vehicle can respond precisely.

Fourth, the tow bar may be equipped with a compressive stop bumper and force sensor for conditions where operating at the shortest tow bar length is desirable. Example conditions include: (i) when it is desirable for the trailing vehicle to do more of the forward motive work than the lead vehicle, (ii) when it is desirable to have the maximum amount of extension preserved for a tight turning maneuver, and (iii) when it is unlikely that an unexpected deceleration by the lead vehicle will occur and/or the forces incurred between the two vehicles would disrupt their intended operation.

Fifth, the tow bar may be equipped with an extension stop bumper and force sensor for conditions where the longest tether bar length is desirable. Example conditions include: (i) when it is desirable for the lead vehicle to do more of the forward motive work than the trailing vehicle, (ii) when the maximum amount of free length is required for tight turning maneuvers, (iii) when it is unlikely that an unexpected acceleration by the lead vehicle will occur and/or the forces incurred between the two vehicles would disrupt their intended operation, and (iv) when it is desirable for the following vehicle to have a higher braking power to keep the connection in-line with the lead vehicle.

Additionally, the structure of the tow bar can serve as a support for communications and power transfer harnesses between the lead and follow vehicles. Further, measurement of the angle of the tow bar independently to the lead and follow vehicles may be used as primary or backup sensing to the onboard electronics/sensors of the lead and/or follow vehicles. Sensing angle directly at the tow bar can prevent jackknife/contact events while making low speed maneuvers in forward or reverse. Finally, an optional locking mechanism is configured to lock the lateral pivoting of the two bars at one end, which can allow for the recovery of a following vehicle that may not have lost electrical power to maintain its independent steering operation.

In the example embodiments, the lead vehicle and trailer vehicle include control systems that include input and output parameters for the multiple motorized and steerable vehicles controlled by a single driver. Rather than having the driver actuate one vehicle and a traditional trailer passively react, all vehicles of the multi-vehicle system are actuated (e.g., controlled) by a single control input. This control affects all aspects of the vehicle dynamic performance including steering, braking, acceleration, reversing maneuvers, and ADAS or autonomous driving systems. Example vehicle systems are described in FIGS. 1-8.

Figure 2:
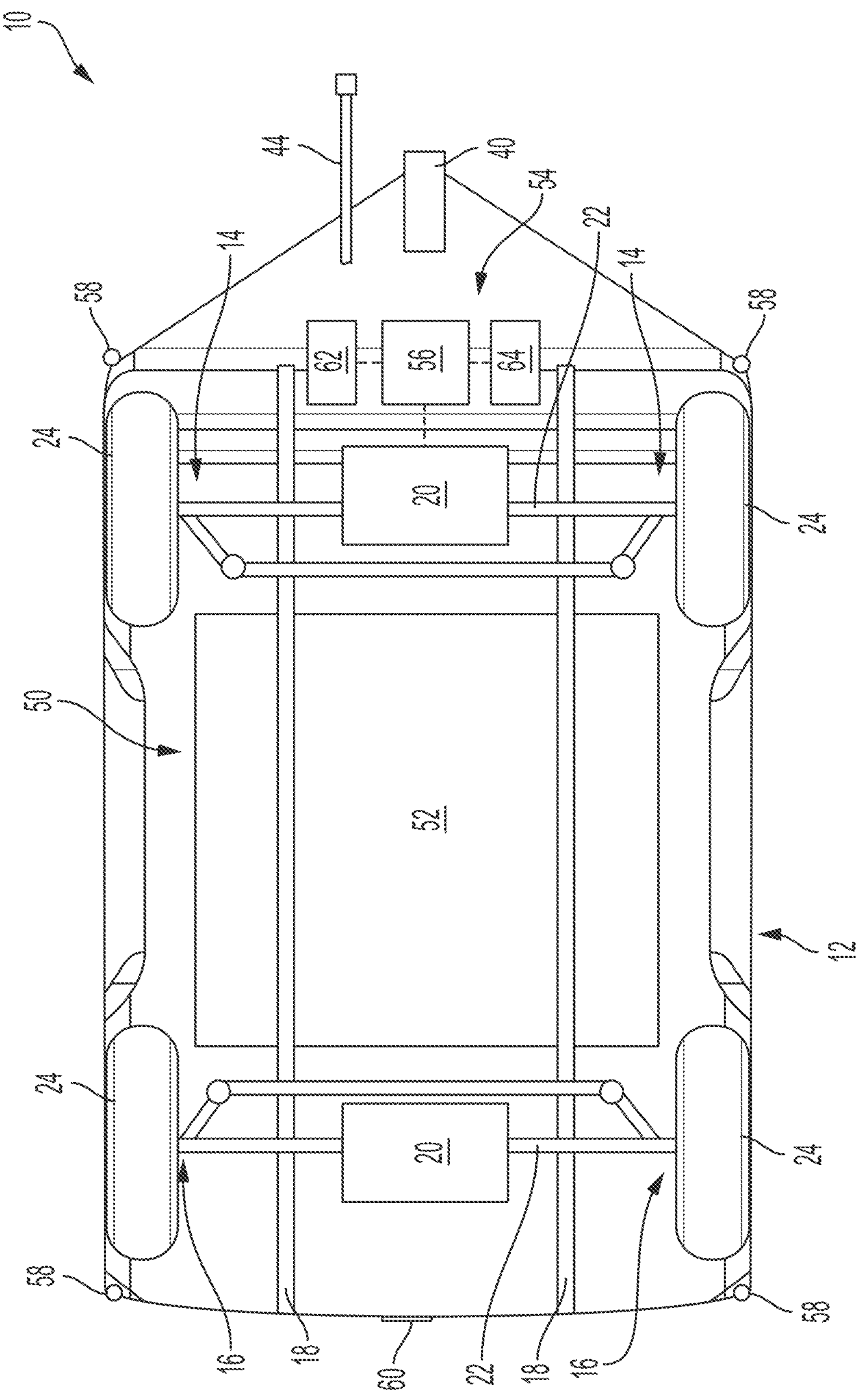
FIG. 2 is a bottom view of the dolly platform system shown in FIG. 1, in accordance with the principles of the present application.

With reference now to FIGS. 1 and 2, the trailer supporting dolly system with independent propulsion and control will be describe in more detail. In some examples, the trailer-supporting dolly system is an auxiliary power dolly that enables small vehicles to tow a trailer such as a gooseneck, fifth wheel, or traditional bumper-pull trailer. The dolly system provides the motive force and energy needed to tow a trailer via an electrified powertrain and batteries. The dolly system attaches to the lead vehicle via a tow bar and supports heavier loads and taller hitch height of a trailer that is specifically designed for trucks with in-bed connections (e.g., fifth wheel, gooseneck). The dolly system functions as a steering axle for the trailer to control its motion via steer-by-wire, and allows separate low-speed remote maneuvering for parking in confined spaces such as parking lots, campgrounds or charging stations.

The dolly system includes suspension (rate and travel) similar to the rear axle of one-ton DRW trucks or enclosed cargo vans. This provides the dolly system with its own ground force reactions for steering, acceleration, and braking to manage loading into the trailer hitch structure similar to "free pivot" designs. The dolly system can also include modular functionality greater than a pickup truck with a bed. For example, the dolly system can include a dump bed with modular side panels that transition between a flat bed and a walled-in bed depending on the cargo. The walled-in bed can include conventional bed sides/walls and a cover for typical truck bed usage. Because the dolly system can be remotely maneuvered at low speeds, the system is highly maneuverable for utility uses such as dumping mulch, collecting/moving firewood, waste/dumpster disposal, etc.

In the example embodiments, the dolly system is configured to support the weight of any type of trailer hitch and acts as an intermediary between the lead vehicle and the trailer. The intermediate body creates backwards compatibility between EVs and older trailers without their own power source. Onboard batteries improve range of the EV/trailer, and allow a smaller lead vehicle to tow a large trailer by handling most or all of the braking and accelerating. The front steering axle pulls the trailer around corners and allows it to accurately follow the lead vehicle path. A low-speed remote maneuvering function allows the trailer to steer into tight spaces with ease. The dolly system's truck bed sides and small size allow users to experience the functionality and utility of a truck only when they need it, allowing them to own a smaller, cheaper, and more fuel-efficient vehicle that suits daily use needs.

The dolly system described herein advantageously provides backwards compatibility for EVs to pull older trailers, does not require users to purchase a new trailer in order to maintain towing range, and allows the driver to steer the trailer much more easily than a conventional trailer because of the active steering axle. The system also provides more control than the passive steering axle of an automated safety hitch, and allows a much smaller vehicle to tow/lead the trailer because of the stability of its four-wheeled chassis and electrified powertrain. As such, the dolly system does all the work of braking, accelerating and steering of the trailer, leaving the lead vehicle to simply be a guide.

With continued reference to FIGS. 1 and 2, a trailer-supporting tug/dolly platform system 10 with independent and autonomous propulsion and control is illustrated. The dolly system 10 advantageously provides a non-powered trailer with a powered trailer having autonomous steering capabilities. The dolly system 10 includes a load platform 12 located above and supported by a front suspension 14, a rear suspension 16, and a frame or chassis 18. The dolly system 10 includes an electric powertrain having one or more electric traction motors 20 that generate and transfer torque to one or more steerable axles 22 and wheels 24 via intermediate components (e.g., a transmission, shafts, differential). The electric traction motor(s) 20 are electrically coupled to and powered by a high voltage battery system 50 having one or more battery packs or modules 52, as described herein in more detail.

In one exemplary implementation, the dolly system 10 is similar to a pickup truck bed, as illustrated. The load platform 12 provides a truck bed or cargo area 26 defined at least partially by a floor 28, a forward wall 30, side walls 32, and a tailgate 34. One or more of the forward wall 30, side walls 32, and tailgate 34 may be removable to transition the dolly system 10 into various configurations for towing and/or cargo hauling. Moreover, the load platform 12 may be articulatable to function as a dump bed.

In the example embodiment, the dolly system 10 includes a lead vehicle hitch connection 40, a trailer hitch structure 42, and a high voltage power connection 44. The lead vehicle hitch connection 40 is configured for removable coupling with a lead vehicle (not shown), for example via the tow bar system 200 described herein. The trailer hitch structure 42 is coupled to the floor 28 and configured to removably couple to a trailer (not shown) such as a fifth wheel or gooseneck trailer. The high voltage power connection 44 is configured to electrically couple to a corresponding connection of the lead vehicle (not shown). The high voltage connection 44 is electrically coupled to the battery pack(s) 52 to enable power connection between the dolly system 10 and the lead vehicle. In this way, battery charge can be shared or redirected between the electric dolly system 10 and an electric lead vehicle.

As shown in FIG. 2, the dolly system 10 includes an advanced driver assistance system (ADAS)/autonomous driving system 54 that generally includes a controller 56, one or more sensors 58, one or more cameras 60, a steer-by-wire control module 62, and one or more actuators 64. The controller 56 is configured to control operation of the dolly system 10 as well as execute at least one ADAS/autonomous driving feature. The sensors 58 and cameras 60 are configured to capture/measure data utilized by the ADAS/autonomous driving system 54 to control the dolly system 10. The steer-by-wire control module 62 is configured to operate the actuators 64 to control driving/operation of the dolly system 10 as part of the ADAS/autonomous driving feature. In this way, the controller 56 is configured to control the electric traction motor(s) 20 and the steerable axle(s) 22 and can be configured for autonomous or manual control of the dolly system 10. Moreover, the controller 56 or other components (e.g., sensors 58, cameras 60) of the ADAS/autonomous driving system 54 may be in signal communication with the lead vehicle (e.g., via electrical connection, wireless, CAN bus, lead vehicle ADAS system, etc.) for cooperative and integrated operation between the dolly system 10 and lead vehicle.

In operation, the dolly system 10 provides motive force and power to tow a trailer via an electrified powertrain and HV battery system 50, including independently performing some or all braking and acceleration of the trailer. This reduces or eliminates power demands on the towing vehicle for acceleration and braking, which allows a smaller vehicle to tow a larger trailer, since the dolly system 10 can balance itself and is not dependent on the towing vehicle to carry significant trailer tongue weight. The dolly system 10 supports the heavier loads and taller hitch height of a trailer specifically designed for trucks with in-bed connections. Advantageously, the dolly system 10 includes its own suspension 14, 16 to provide its own ground force reactions for steering, acceleration and braking to manage loading in the trailer hitch structure. Moreover, the ADAS/autonomous driving system 54, including the steer-by-wire control module 62, is utilized to control the steering axle(s) 22 to provide and control its own motion of the attached trailer. Additionally, the dolly system 10 can be controlled (e.g., driven) in a low-speed remote maneuvering mode via a control unit (not shown) such as, for example, a user interface in the towing vehicle, a user interface on the dolly system, a smart phone app, etc. This is particularly useful for parking in tight confines such as parking spaces, charging stations, camping sites, etc.

Figure 3:
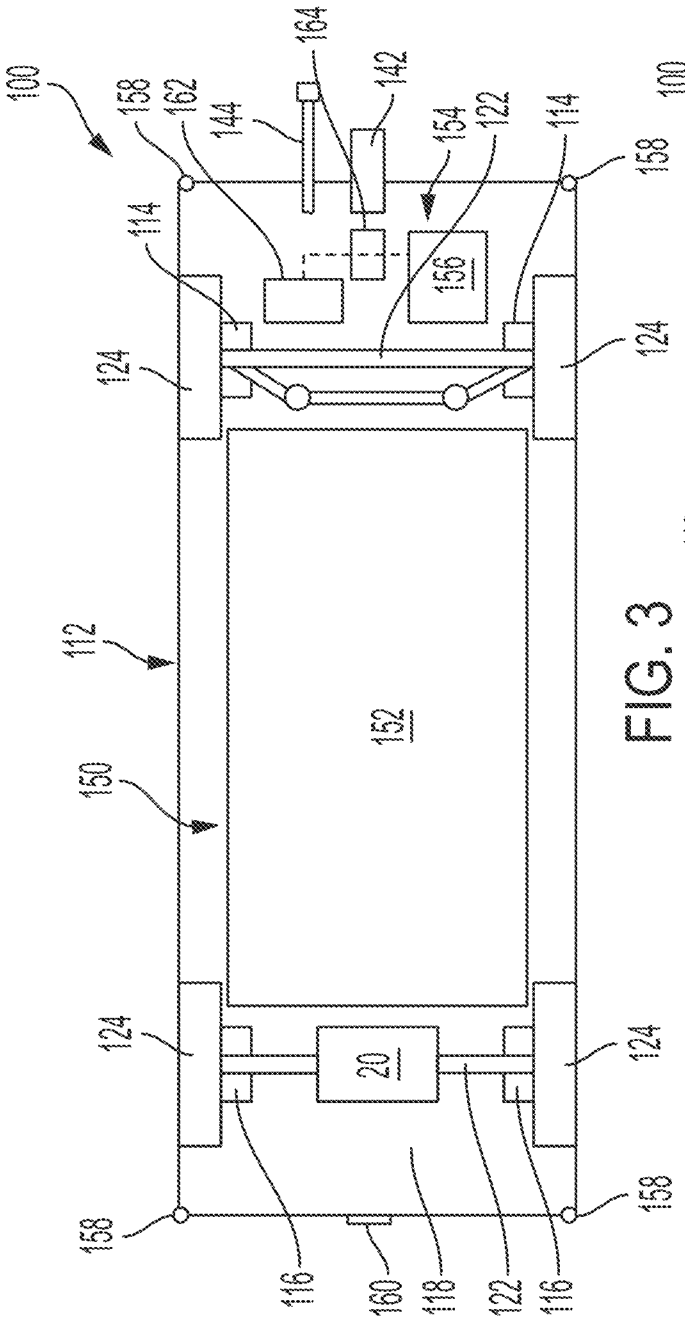
FIG. 3 is a bottom view of an example trailer platform system in accordance with the principles of the present application.
Figure 4:
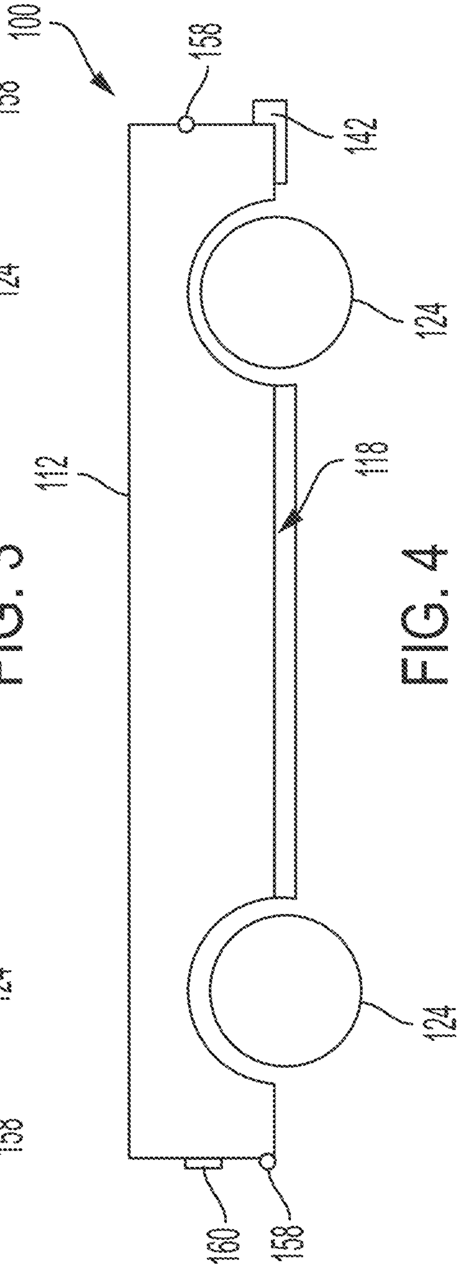
FIG. 4 is a side view of the trailer platform system shown in FIG. 3, in accordance with the principles of the present application.

With reference now to FIGS. 3 and 4, the trailer platform system with independent propulsion and control will be described in more detail. In some examples, the trailer platform system is a self-propelled battery electric vehicle (BEV) based, wagon style (e.g., wheel at four corners) trailer, with autonomous driving control capability. The trailer platform system generally includes a chassis, wheels, tires, suspension, brakes, a battery pack, electric drive motor(s), control modules (e.g., controllers), a steer-by-wire system, camera(s), and/or sensor(s). The system operates by interacting with some or all of the following components on the lead vehicle: vehicle CAN bus, trailer hitch load cell, vehicle dynamics control module(s), and autonomous sensors and ADAS control module(s). The system is also configured to share battery charge between the lead vehicle and the trailer platform.

In the example embodiment, the trailer platform system provides the motive force and energy needed to tow a trailer via an electrified powertrain and batteries. The system attaches to the lead vehicle (e.g., through a wireless or wired connection and a tow bar) and is configured to support its own weight. The trailer includes a steering axle to control its motion via steer-by-wire and allows separate low-speed remote maneuvering. The trailer system includes a suspension (rate and travel) similar to the rear axle of a one-ton DRW truck or enclosed cargo van to provide its own ground force reactions for steering, acceleration and braking, to thereby manage loading and clearance to the lead vehicle. In one example, with a highly autonomous lead vehicle, the lead vehicle can control the trailer remotely to the autonomy level, and associated cost and weight of the trailer can be reduced by eliminating the ADAS sensors and controllers from the trailer.

In some examples, the included battery pack, motor(s), and controller(s) are sized to reduce or eliminate power demands on the lead vehicle for acceleration and braking. The wagon style trailer setup (with wheels at the four corners of the trailer instead of near the middle of the trailer length for traditional towed trailers) will allow a smaller vehicle to tow a larger trailer, since the trailer can balance itself and is not dependent on the lead vehicle to carry significant trailer tongue weight. The dynamic steering and propulsion/braking capability allows the trailer to correct the trailer's path when turning while moving in forward or reverse to follow the lead vehicles intended path more closely than traditional trailers. This can also allow for trailer obstacle avoidance and enhanced trailer stability control.

The trailer platform system advantageously provides autonomous dynamic control (e.g., acceleration, braking, steering) to a trailer, controlled either through self-contained systems or communication with lead vehicle autonomous systems. The wagon-style chassis can be used in light and medium duty trailer categories for on-road use. The actively steered axle allows greater steering control and the ability to reverse as compared to low-speed farm/utility wagons.

With continued reference to FIGS. 3 and 4, a trailer platform system 100 with independent and autonomous propulsion and control is illustrated. The trailer platform system 100 includes a load platform 112 located above and supported by a front suspension 114, a rear suspension 116, and a frame or chassis 118. The trailer platform system 100 includes an electric powertrain having one or more electric traction motors 120 that generate and transfer torque to one or more steerable axles 122 and wheels 124 via intermediate components (e.g., a transmission, shafts, differential). The electric traction motor(s) 120 are electrically coupled to and powered by a high voltage battery system 150 having one or more battery packs or modules 152. As illustrated, in the example embodiment, the wheels 124 are located at the four corners of the trailer instead of near the middle of the trailer length.

In the example embodiment, the trailer platform system 100 includes a lead vehicle hitch connection 142 and a high voltage power connection 144. The hitch connection 142 is coupled to the chassis 118 and is configured for removable coupling with a lead vehicle (not shown), for example via the tow bar system 200 described herein. The high voltage power connection 144 is configured to electrically couple to a corresponding high voltage connection of the lead vehicle (not shown). The high voltage power connection 144 is electrically coupled to the battery pack(s) 152 to enable power connection between the trailer platform system 100 and the lead vehicle. In this way, battery charge can be shared or redirected between the electrically driven trailer platform system 100 and an electric lead vehicle.

As shown in FIG. 3, the trailer platform system 100 includes an advanced driver assistance system (ADAS)/autonomous driving system 154 that generally includes a controller 156 (e.g., PCM), one or more sensors 158, one or more cameras 160, a steer-by-wire control module 162, and one or more actuators 164. The controller 156 is configured to control operation of the trailer platform system 100 as well as execute at least one ADAS/autonomous driving feature. The sensors 158 and cameras 160 are configured to capture/measure data utilized by the ADAS/autonomous driving system 154 to control the trailer platform system 100. The steer-by-wire control module 162 is configured to operate the actuators 164 to control driving/operation of the trailer platform system 100 as part of the ADAS/autonomous driving feature. In this way, the controller 156 is configured to control the electric motor(s) 120 and the steerable axle(s) 122 and can be configured for autonomous or manual control of the trailer platform system 100. Moreover, the controller 156 or other components (e.g., sensors 158, cameras 160) of the ADAS/autonomous driving system 154 may be in signal communication with the lead vehicle (e.g., via electrical connection, wireless connection, CAN bus, lead vehicle ADAS system, etc.) for cooperative and integrated operation between the trailer platform system 100 and lead vehicle.

In operation, the trailer platform system 100 provides motive force and power to tow a trailer via an electrified powertrain and HV battery system 150, including independently performing some or all braking and acceleration of the trailer. This reduces or eliminates power demands on the towing vehicle for acceleration and braking, which allows a smaller vehicle to tow a larger trailer, since the trailer platform system 100 can balance itself and is not dependent on the towing vehicle to carry significant trailer tongue weight. Advantageously, the trailer platform system 100 includes its own suspension 114, 116 to provide its own ground force reactions for steering, acceleration and braking to manage loading in the trailer hitch structure. Moreover, the ADAS/autonomous driving system 154, including the steer-by-wire control module 162, is utilized to control the steering axle(s) 122 to provide and control its own trailer motion. Additionally, the trailer platform system 100 can be controlled (e.g., driven) in a low-speed remote maneuvering mode via a control unit (not shown) such as, for example, a user interface in the towing vehicle, a user interface on the trailer platform system, a smart phone app, etc. This is particularly useful for parking in tight confines such as parking spaces, charging stations, camping sites, etc.

With reference now to FIGS. 5-8, the tow bar system will be described in more detail. In some examples, the tow bar system is configured for independently steered and powered trailers and includes: (a) a five degree of freedom connection at both ends of the tow bar to allow articulation between the two vehicles, (b) a means of adjusting the length of the bar between the lead and follow vehicles, (c) a means of locking the adjusted length after the connection has been made between the vehicles, (d) a means to absorb harsh compressive loads that could occur while braking or steering, (e) a means to absorb harsh tensile loads that could occur while accelerating or steering, (f) a means to support and route an electrical cable connection between the lead and follow vehicles, (g) an optional means to sense angular difference between the tow bar and either one or both lead and follow vehicle, (h) a means of sensing tensile and compressive loads in the tow bar, (i) an optional means to lockout the lateral steering degree of freedom at one end of the tow bar, (j) a length sensing device that includes a free sliding mechanism allowing length changes between the vehicle connections within a defined min and max distance between the lead and follow vehicles, and/or (k) a length sensor for sensing the extended length of the tow bar to provide distance and velocity/acceleration rate of change status information to the vehicle control systems. The mechanical assembly is configured to attach between the rear trailer towing connection of the lead vehicle and a front/center towing connection like a typical rear towing connection.

The tow bar system provides a physical linkage between two vehicles that have the independent ability to accelerate and decelerate (fore/aft) via human or autonomous control, and steer laterally via human or autonomous driving control. The system provides additional degrees of freedom as a link between the two vehicles to allow improved articulation between the leading and following vehicles, leaving only a tension/compression load and nominal length constraint. The system does not support vertical loading between the two vehicles, so no weight is transferred therebetween and having a negative effect on the handling of them individually or as a pair. The system also does not transfer lateral moment loading between the vehicles unless a tensile or compressive load is created by a speed differential between the vehicle attachment points. This feature will eliminate any possibility of the following vehicle imparting trailer sway to the lead vehicle, and allow the lead and follow vehicles to maintain an offset within the lane width when it may be advantageous for crosswind drag or visibility in outside lanes. As such, the tow bar system allows vehicles that may be mismatched in terms of turning radius (e.g., due to differences in wheelbase) to follow in a best fit path via independent physical, but electronically linked steering, acceleration, and braking controls.

Additionally, the tow bar system advantageously provides one or more of the following optional benefits over conventional trailer attachment: (a) additional angular tolerance for the connection eliminates the need for jacking or height adjustments on flat or angled ground; (b) optional selectable length adjustment combined with feature (a) eliminates the need for a precise distance between the two vehicles; (c) once the mechanical connections have been made the nominal length will be set and locked at the bar, or by moving one of the vehicles to the next locking point; (d) allowing for some compression travel within the tow bar will allow for latency between the lead vehicle initiating a braking event before the following vehicle can respond precisely. A relatively small amount of compressive travel will reduce the load on the tow bar and any shock or bump that might be felt by the vehicle occupants; (e) allowing some extension travel provides the same benefits as feature (d) for acceleration and can also be used if it is desirable for the following vehicle to have a higher braking power to keep the connection in-line with the lead vehicle; (f) the structure of the tow bar can serve as a support for communications and power transfer harnesses between the lead and follow vehicles, though a wired connection may not be required if wireless technology is used; (g) optional measurement of the angle of the tow bar to the lead and follow vehicles could be used as a primary or back-up sensing to the onboard electronics of the lead and/or follow vehicles, while sensing angle directly at the tow bar can prevent jackknife/contact events while making low speed maneuvers in forward or reverse; (h) sensing the tensile and compressive loading present in the tow bar can provide a primary or secondary means of balancing or targeting a desired force during acceleration, cruising at steady speed and braking forces between the two vehicles; and (i) optional ability to lock the lateral pivoting of the tow bar at one end, which allows for the recovery of a following vehicle that may not have lost electrical power to maintain its independent steering operation or may have reduced braking performance. The lock could be set manually or while driving if a loss of power or function is detected.

In some examples, the tow bar system advantageously provides: spherical degrees of freedom at both ends of the tow bar, which allows active steering of the trailing vehicle, as opposed to flat towing where the front wheels of the tow vehicle must follow the path dictated by a rigid tow bar. The system also includes a powered trailer, which allows reversing maneuvers that are not possible with flat towing. Steering of the trailer is controlled electronically, allowing reverse movement without jackknifing, and left-right bias relative to the lead vehicle. The system supplies all or most of the pulling power needed to move the trailer with any lead vehicle, as enabled by a load cell in the tow bar. The system is a simply supported beam connection so the lead vehicle does not have to support the trailer's weight.

Figure 5:
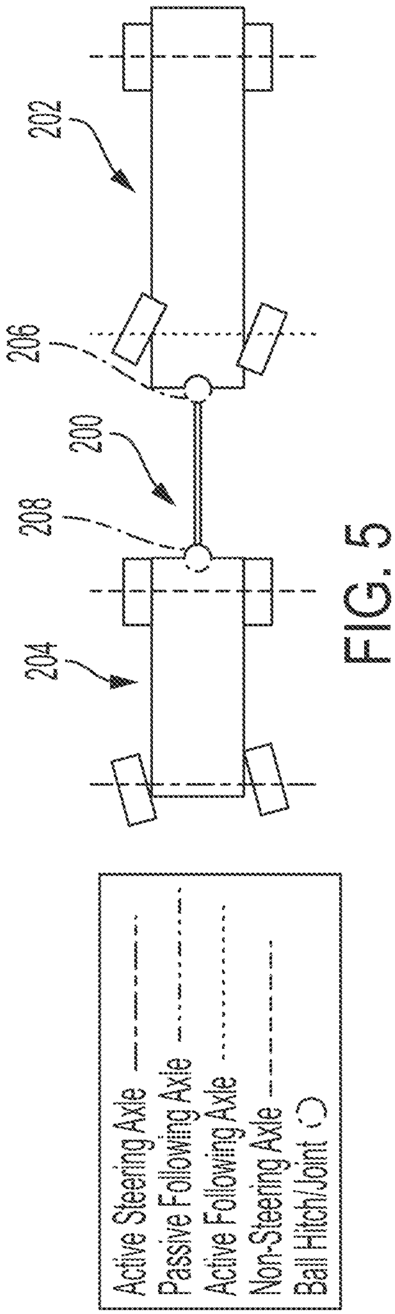
FIG. 5 is a schematic illustration of an example tow bar system connecting a lead vehicle and a trailing vehicle, in accordance with the principles of the present application.
Figure 6:
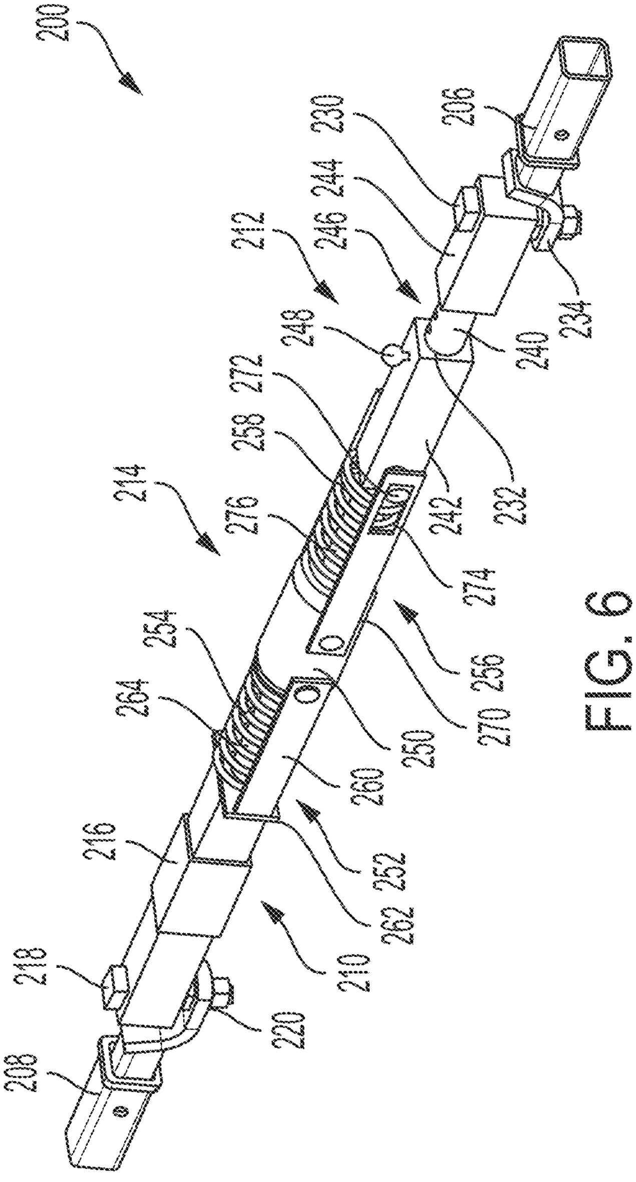
FIG. 6 is a perspective view of the example tow bar system shown in FIG. 5, in accordance with the principles of the present application.

With continued reference to FIGS. 5-8, a tow bar system 200 for independently steered and powered trailers is illustrated. As shown in FIG. 5, the tow bar system 200 is configured to removably couple a trailing vehicle 202 (e.g., a trailer) to a lead vehicle 204. The trailing vehicle 202 includes a hitch receiver 206, and the lead vehicle includes a hitch receiver 208. As shown in FIG. 6, the tow bar system 200 generally includes a front tow bar 210 and a rear tow bar 212 coupled by a damper system 214. The tow bar system 200 is configured to support and route an electrical cable connection (not shown) between the lead and follow/tow vehicles, for example to provide signal communication (e.g., from sensors, cameras, etc.) or shared high voltage therebetween.

In the example embodiment, the front tow bar 210 is configured to removably couple to a hitch 220 received by the lead vehicle hitch receiver 208. As illustrated, the front tow bar 210 includes a load cell 216 and an angle sensor 218. The load cell 216 is configured to sense various forces on the tow bar system 200 including a trailer tongue weight, tension, and compression. The angle sensor 218 is configured to sense an angle between the lead vehicle 204 and a longitudinal axis of the front tow bar 210. The load cell 216 and the angle sensor 218 are in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the load cell 216 and angle sensor 218 to control one or more operations of the vehicles 202, 204.

The rear tow bar 212 is configured to removably couple to a hitch 234 received by the trailing vehicle hitch receiver 206. The rear tow bar 212 includes an angle sensor 230 and a length adjustment and locking mechanism 232. The angle sensor 230 is configured to sense an angle between the trailing vehicle 202 and the longitudinal axis of the rear tow bar 212. The angle sensor 230 is in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the angle sensor 230 to control one or more operations of the vehicles 202, 204.

In the example embodiment, the length adjustment and locking mechanism 232 generally includes a locking bar 240 extending between a forward bar 242 and a rearward bar 244. The locking bar 240 is rigidly coupled to the rearward bar 244 and is slidingly received within the forward bar 242. The locking bar 240 includes a plurality of axially spaced apertures 246 configured to selectively receive a pin 248 therein to lock-in the relative distance between the forward bar 242 and the rearward bar 244. The pin 248 is removable to allow sliding adjustment of the locking bar 240 to establish a desired length of the rear tow bar 212. It will be appreciated however that rear tow bar 212 may have any suitable alternative configuration that enables length adjustment of the rear tow bar 212, and such a length adjustment system may additionally or alternatively be utilized with the front tow bar 210.

In the example implementation, the damper system 214 is disposed between the front tow bar 210 and the rear tow bar 212 and generally includes a damper 250, a front support 252, a front biasing mechanism 254 (e.g., a spring), a rear support 256, and a rear biasing mechanism 258 (e.g., a spring).

The front support 252 includes a pair of spaced apart support bars or members 260 with first ends coupled to an end plate 262, and opposite second ends coupled to the damper 250. The end plate 262 is coupled to and/or disposed against the front tow bar 210. The front biasing mechanism 254 is disposed about a front guide post 264 and positioned between the end plate 262 and the damper 250. The front guide post 264 is integral with or rigidly coupled to the front tow bar 210 and extends through an aperture formed in the end plate 262. In one example embodiment, the front biasing mechanism 254 is an extension spring configured to bias the front tow bar 210 and damper 250 towards each other, and absorb tensile forces in the tow bar system 200. The damper 250 is a generally cylindrical damping member fabricated from a suitable damping material configured to absorb forces (e.g., tension, compression) experienced in the tow bar system 200 during towing operations.

The rear support 256 includes a pair of spaced apart support bars or members 270 with first ends coupled to the damper 250, and opposite second ends coupled to the rear tow bar 212, for example, via the illustrated pins 272. The second end of each support member 270 includes a window 274 configured to slidingly receive pin 272. In this way, pins 272 are configured to translate fore/aft within the windows 274. The rear biasing mechanism 258 is disposed about a rear guide post 276 and positioned between the damper 250 and the rear tow bar 212. The rear guide post 276 is integral with or rigidly coupled to the rear tow bar 212. In one example embodiment, the rear biasing mechanism 258 is a compression spring configured to bias apart the damper 250 and rear tow bar 212 and absorb compressive forces in the tow bar system 200.

Figure 7:
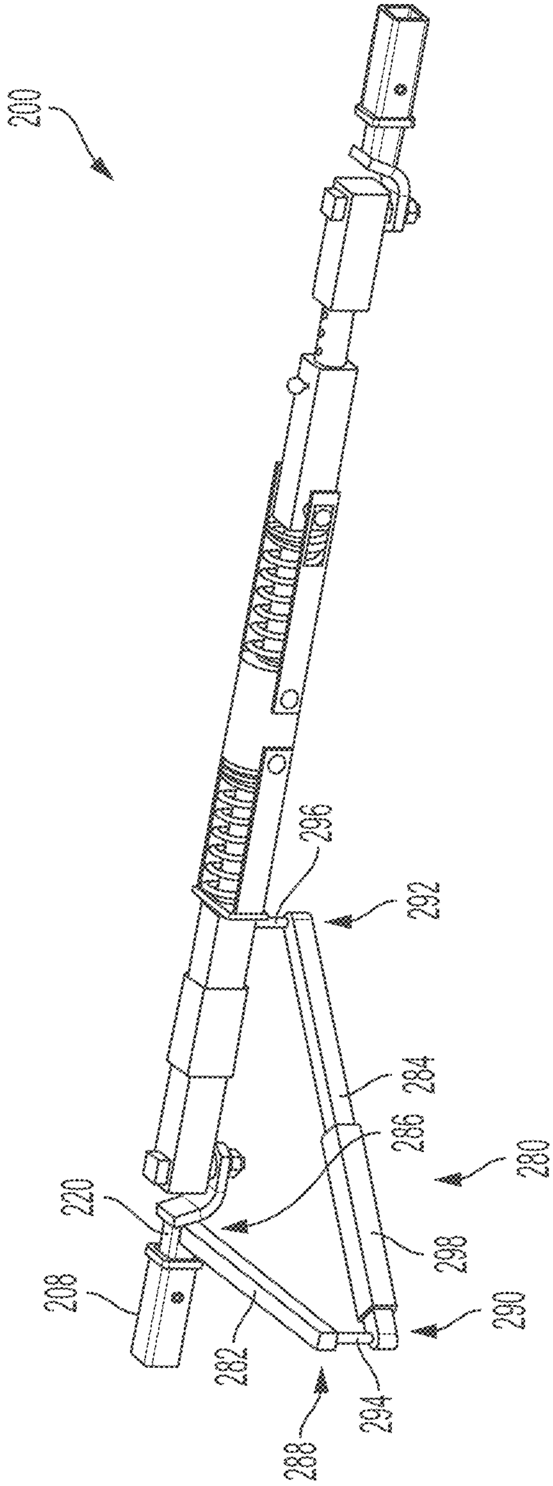
FIG. 7 is a perspective view of the example tow bar system shown in FIG. 6 with an example horizontal lockout assembly, in accordance with the principles of the present application.

FIG. 7 illustrates the tow bar system 200 with a horizontal lockout assembly 280 configured to lock out the lateral steering degree of freedom at one end of the tow bar if steering control is lost on the trailing vehicle 202. In this way, the horizontal lockout assembly 280 is configured to turn the tow bar system 200 into a rigid tow bar to prevent loss of lateral control.

In the example embodiment, the horizontal lockout assembly 280 generally includes a horizontal bar or member 282 and an angled bar or member 284. The horizontal member 282 includes a first end 286 coupled to the hitch 220 and an opposite second end 288. The angled member 284 includes a first end 290 and an opposite second end 292. The first end 290 is pivotally coupled to the horizontal member second end 288 via a pin 294, and the second end 292 is pivotally coupled to the front tow bar 210 via a pin 296. The angled member 284 includes a sliding joint 298 that enables a length of the angled member 284 to change to allow a full range of articulation of the tow bar system 200. If there is a loss of power and/or communication with the trailing vehicle 202, the sliding joint 298 is configured to lock and prevent loss of lateral control of the trailing vehicle 202.

In operation, the tow bar system 200 is configured to absorb harsh tensile and compressive loads that occur while steering, braking, and accelerating. Moreover, the length of tow bar system 200 is adjustable via the length adjustment and locking mechanism 232. The various sensors included with tow bar system 200 enable sensing of tensile/compressive loads as well as the angular difference between the tow bar and the lead and follow vehicles. This enables a self-powered, steering capable follow vehicle (e.g., dolly system 10, trailer platform system 100) to accelerate/decelerate, brake, and steer via human or autonomous control. As such, the tow bar system 200 enables a vehicle/trailer that may be mismatched in terms of turning radius to follow in a best fit path via independent physical, electronically linked steering, acceleration, and braking controls.

Figure 8:
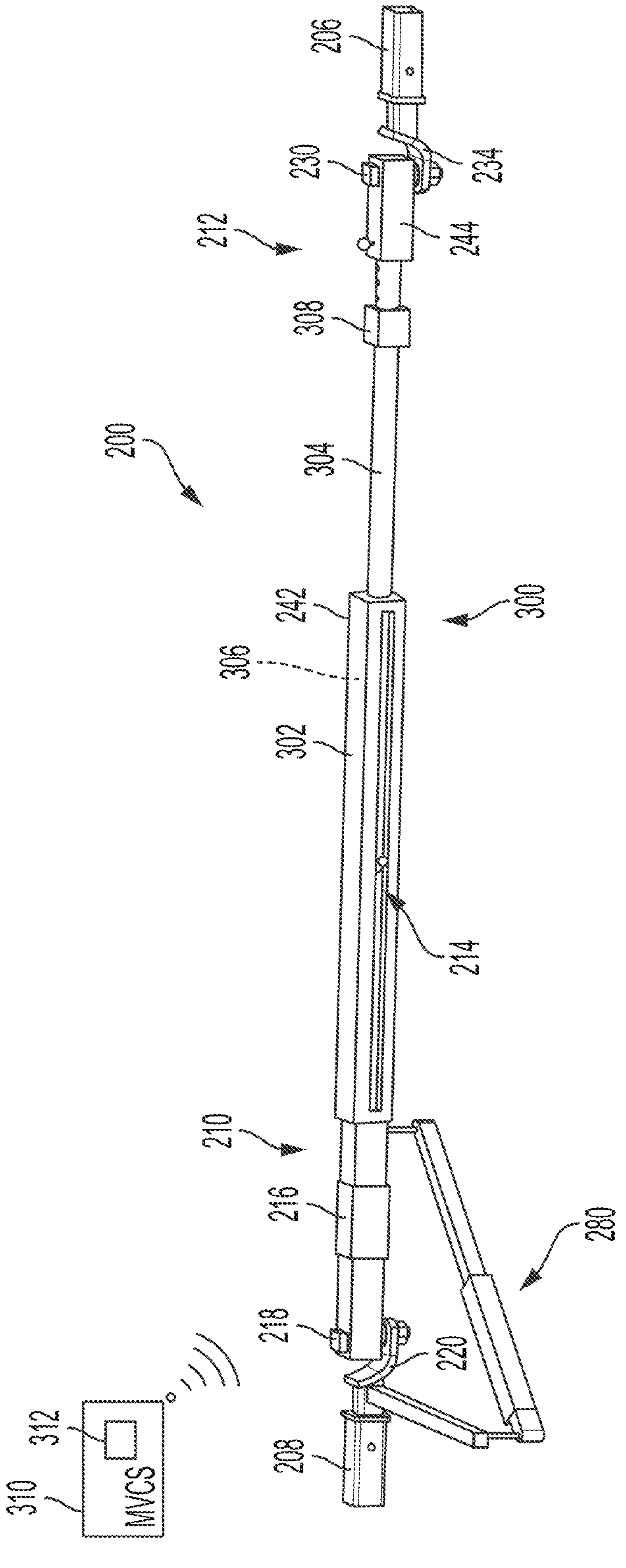
FIG. 8 is a perspective view of another example tow bar system, in accordance with the principles of the present application.

FIG. 8 illustrates the tow bar system 200 with an additional length sensing hitch 300 configured to sense the length of the tow bar and provide distance and derivative status information to dynamic control systems of the lead vehicle 204 and/or the trailing vehicle 202. In one example, the derivative status information includes a rate of change of the velocity and/or acceleration of the individual vehicles 202, 204 or the entire multi-vehicle system.

In the example embodiment, the length sensing hitch 300 generally includes a length sensor housing 302, an extension bar 304, and a length sensor 306. The length sensor housing 302 is configured to house the length sensor 306 and any desired additional components such as, in the illustrated example, the damper system 214. The extension bar 304 is a free-sliding bar that allows opposite attachment ends of the tow bar system to move towards or apart from each other.

In the illustrated example, the extension bar 304 is a free-sliding, extendible/translatable bar disposed between the forward bar 242 (shown disposed within housing 302) and an intermediate bar 308 (or rearward bar 244). The extension bar 304 is rigidly coupled to the intermediate bar 308 and is slidingly (e.g., telescopically) received within the forward bar 242. In some examples, the extension bar 304 may allow a significant amount of extension or compression (e.g., 1.0 to 1.5 meters) to facilitate preventing any acceleration or braking forces from being transferred between the two vehicles 202, 204. Additionally, to accommodate this particular arrangement, the locking mechanism 232 is reversed and the locking bar 240 is rigidly coupled to the intermediate bar 308 and slidingly received within the rearward bar 244.

The length sensor 306 is configured to sense a distance of extension of the extension bar 304 relative to the forward bar 242. While not limited to any particular device, examples of the length sensor 306 include a linear potentiometer, a linear encoder, or a set of rack and pinion gears operably associated with a rotary encoder. In this way, the length sensor 306 is configured to monitor a varying length of the tow bar system 200 between the trailing and lead vehicles 202, 204 during operation.

In some embodiments, the relative acceleration between the lead vehicle 204 and the trailer 202 is determined by measuring the tensile or compressive force on the tow bar via load cell 216. In other embodiments, the relative velocity and/or acceleration are determined by measuring the length of the sliding connection at multiple points in time via length sensor 306. As such, the relative velocity/acceleration between the two vehicles 202, 204 is determined by monitoring the amount of extension or compression of the tow bar. Although FIG. 8 illustrates the inclusion of load cell 216, it will be appreciated that length sensing hitch 300 may be utilized in place of, or in addition to, load cell 216.

The tow bar system 200 may be in signal communication with and part of a multi-vehicle control system (MVCS) 310 such as that described in commonly owned, co-pending U.S. patent application Ser. No. 18/190,588, filed on Mar. 27, 2023 and U.S. patent application Ser. No. 18/308,836, filed on Apr. 28, 2023, the contents of which are incorporated herein in their entirety by reference thereto. In general, the MVCS 310 includes one or more controllers 312 configured to receive various inputs such as, for example, tow bar system inputs, driver control inputs, inputs from various ADAS sensors, pre-programmed preferences and settings, or inputs from other sources.

The MVCS 310 may utilize or include the one or more controllers (including controllers of vehicle 202, 204) to receive the one or more signals and execute one or more algorithms to provide the desired multi-vehicle control response to improve all aspects of the multi-vehicle system dynamic performance including steering, braking, acceleration, reversing maneuvers, and additional ADAS/autonomous function. Based on the received inputs, the MVCS 310 constructs output(s) to optimize performance of the multi-vehicle system, which includes the tow bar system 200, trailer vehicle 202, and lead vehicle 204. In this way, the MVCS 310 treats the multiple vehicles as separate, but dynamically connected bodies, and translates driver inputs into optimal full-system performance.

Figure 9:
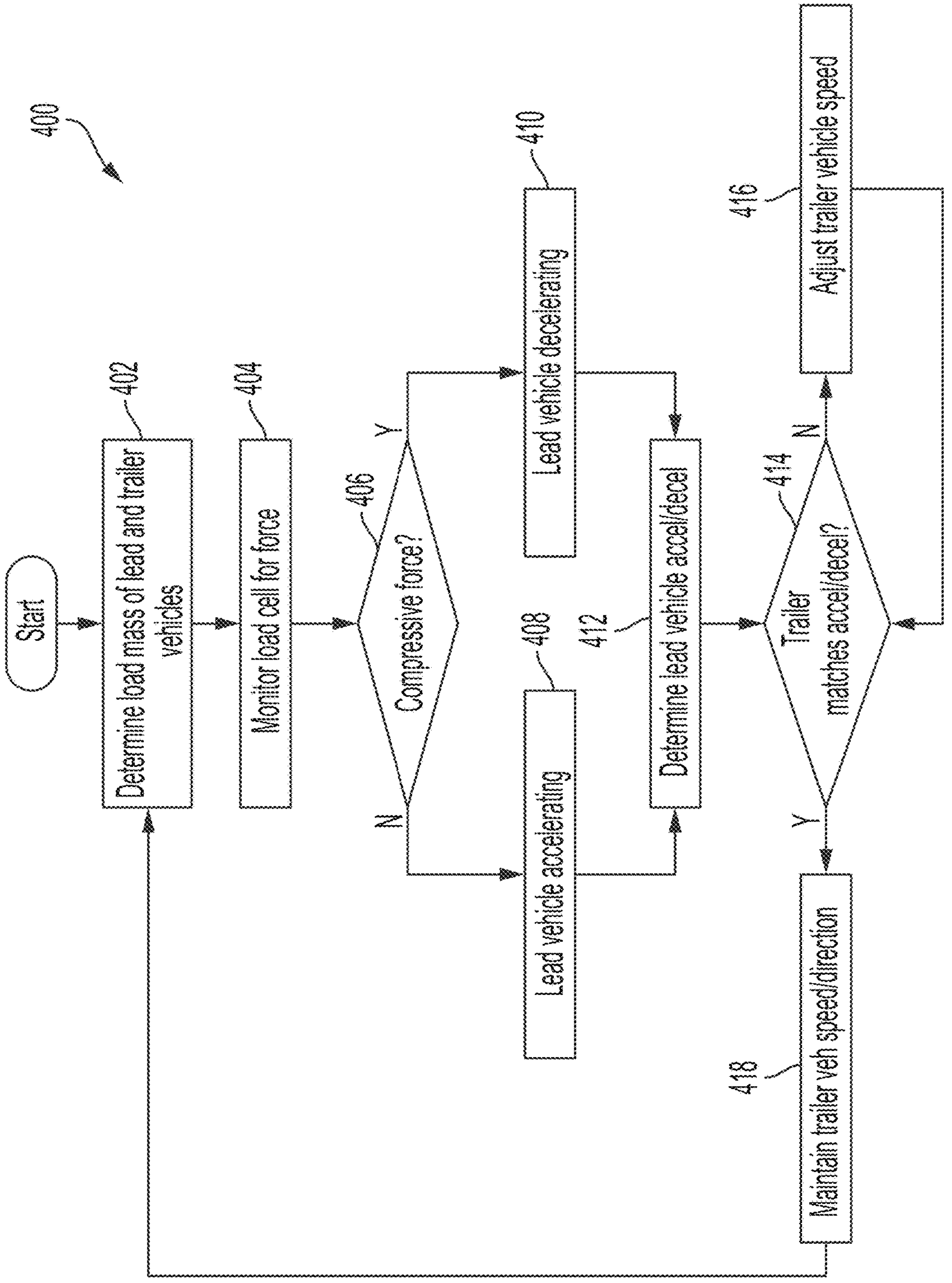
FIG. 9 illustrates a flow diagram of an example method of controlling a multi-vehicle system utilizing the tow bar system, in accordance with the principles of the present application.
Figure 10:
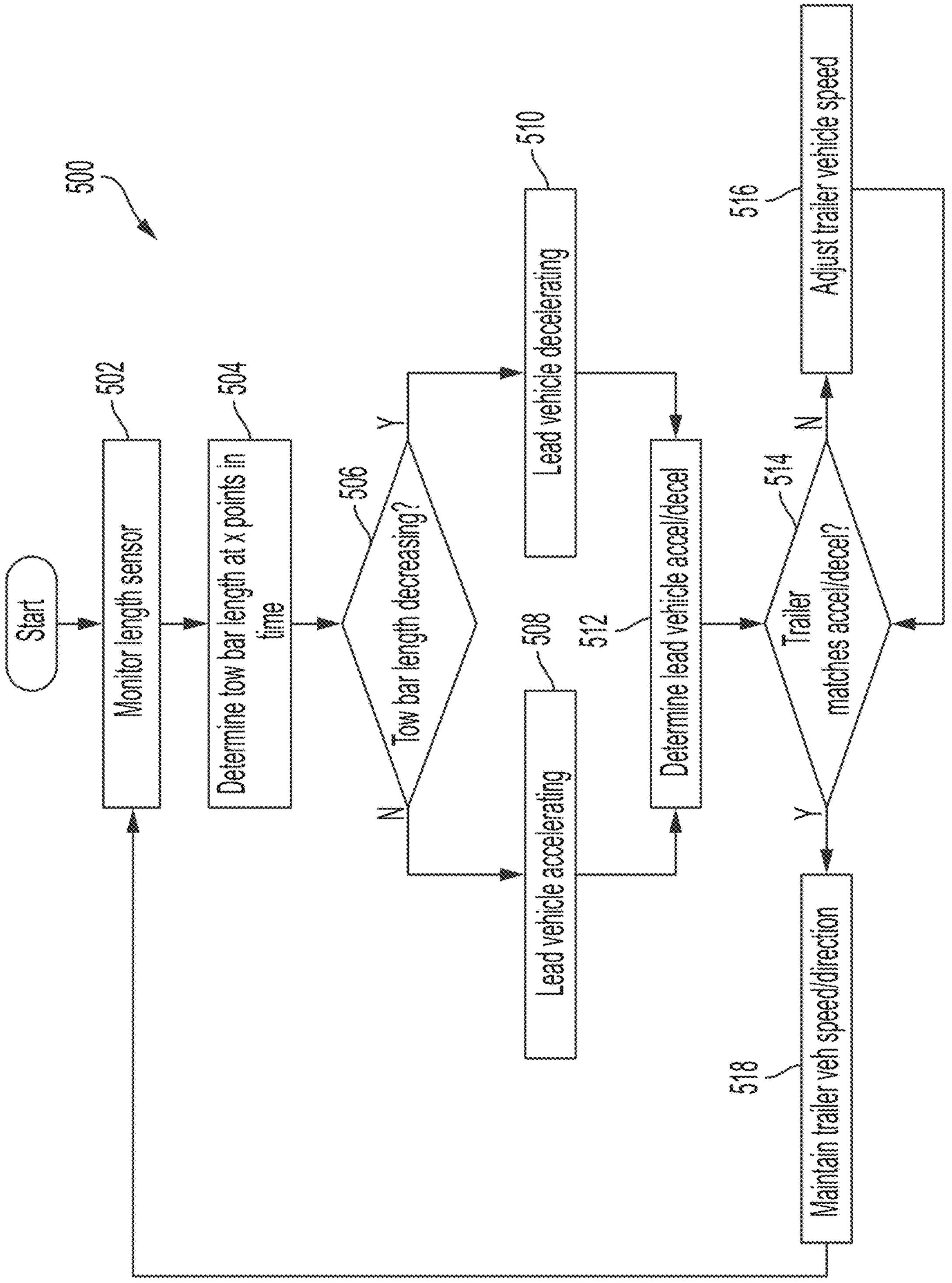
FIG. 10 illustrates a flow diagram of another example method of controlling a multi-vehicle system utilizing the tow bar system, in accordance with the principles of the present application.

With reference now to FIGS. 9 and 10, example methods of dynamic control of the multi-vehicle system 202, 204 utilizing the tow bar system 200 is described in more detail. Advantageously, the MVCS 310 is configured to monitor the load cell 216, the extension sensor 306, or a combination of both, and subsequently modulate (e.g., brake, steer, accelerate, etc.) the vehicles 202, 204 based on either force (FIG.

9) using the load cell 216, or relative velocity and/or acceleration (FIG. 10) using the length sensor 306.

FIG. 9 illustrates an example method 400 of dynamic control of the multi-vehicle system utilizing the tow bar system 200 with load cell 216. In the example embodiment, the method starts at step 402 and the MVCS 310 ("control") determines a load mass of the trailer vehicle 202 and the lead vehicle 204. In one example, the load mass may be determined by payload sensors (not shown) installed on the vehicles 202, 204 or stored in a vehicle profile. At step 404, control monitors the load cell 216 and determines a force thereon. At step 406, control determines if the force on the load cell 216 is a compressive force. If no, control proceeds to step 408. If yes, control proceeds to step 410.

At step 408, control determines the lead vehicle 204 is accelerating based on the monitored force (step 404) and subsequently proceeds to step 412. Alternatively, at step 410, control determines the lead vehicle 204 is decelerating based on the monitored force (step 404) and subsequently proceeds to step 412. At step 412, control determines the acceleration or deceleration of the lead vehicle 204, for example, by dividing the measured force on the load cell 216 (step 404) by the load mass of the lead vehicle 204 (step 402).

At step 414, control determines if trailer acceleration/deceleration matches the lead vehicle acceleration/deceleration (step 412) (e.g., within a predefined tolerance). If no, at step 416, control adjusts the speed of trailer vehicle 202 to match the lead vehicle 204 and control returns to step 414. If yes, at step 418, control maintains the speed and steering direction of trailer vehicle 202 and returns to step 402.

FIG. 10 illustrates an example method 500 of dynamic control of the multi-vehicle system utilizing the tow bar system 200 with length sensor 306. In the example embodiment, the method starts at step 502 and the MVCS 310 ("control") monitors the length sensor 306. At step 504, measures or determines a total length of the tow bar at a predetermined number of points in time (e.g., three time points). At step 506, based on the determined lengths, control determines if the length of the entire tow bar or extension bar 304 is decreasing. If no, control proceeds to step 508. If yes, control proceeds to step 510. Alternatively, control may determine if the length of the tow bar is increasing.

At step 508, if the tow bar length is not decreasing, control determines the lead vehicle 204 is accelerating and subsequently proceeds to step 512. Alternatively, at step 510, if the tow bar length is decreasing, control determines the lead vehicle 204 is decelerating and subsequently proceeds to step 512. At step 512, control determines the relative acceleration or deceleration of the lead vehicle 204, for example, by integrating the determined lengths at the predetermined points in time (step 504), to thereby determine an acceleration rate of change.

At step 514, control determines if trailer acceleration/deceleration matches the lead vehicle acceleration/deceleration (step 512) (e.g., within a predefined tolerance). If no, at step 516, control adjusts the speed of trailer vehicle 202 to match the lead vehicle 204 and control returns to step 514. If yes, at step 518, control maintains the speed and steering direction of trailer vehicle 202 and returns to step 502.

Described herein are systems and methods for dynamically controlling a system of two or more self-powered, self-guided vehicles. A tow bar system is connected between the two vehicles and includes a free sliding, length sensing hitch configured to sense a change in length of the tow bar. A control system utilizes inputs from the length sensing hitch to determine relative acceleration or deceleration of the lead vehicle, and subsequently adjusts braking and acceleration of the trailer vehicle to match the lead vehicle to thereby improve dynamic performance, stability, and maneuverability.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A tow bar system for coupling a multi-vehicle system including a lead vehicle and an independently steered and powered trailer vehicle, comprising:

a length sensing hitch having a first end configured to removably couple to a hitch of the lead vehicle, and an opposite second end configured to removably couple to a hitch of the trailer vehicle;

a free sliding bar disposed between the first and second ends and configured to allow extension and compression of the length sensing hitch during operation of the multi-vehicle system; and a length sensor operably associated with the free sliding bar to continuously sense a dynamic length of the tow bar system during operation of the multi-vehicle system to facilitate determining a relative acceleration between the lead vehicle and the trailer vehicle.

2. The tow bar system of claim 1, wherein the length sensor is configured for signal communication with a multi-vehicle control system (MVCS) of the lead vehicle and/or the trailer vehicle.

3. The tow bar system of claim 2, further comprising an angle sensor disposed on the first end and configured to sense an angle between the lead vehicle and the first end, wherein the angle sensor is in signal communication with the MVCS.

4. The tow bar system of claim 2, further comprising an angle sensor disposed on the second end and configured to sense an angle between the trailer vehicle and the second end, wherein the angle sensor is in signal communication with the MVCS.

5. The tow bar system of claim 2, further comprising a load cell configured to sense one or more forces on the tow bar system, wherein the load cell is in signal communication with the MVCS.

6. The tow bar system of claim 1, further comprising a damper system disposed between the first end and the second end and configured to absorb compressive and tensile loads occurring during steering, accelerating, and braking of the independently steered and powered trailer vehicle.

7. The tow bar system of claim 6, wherein the damper system comprises:

a damper;

a front support coupled between a front tow bar and the damper; and a rear support coupled between a rear tow bar and the damper.

8. The tow bar system of claim 7, wherein the damper system further comprises:

a front biasing mechanism positioned within the front support between the front tow bar and the damper; and a rear biasing mechanism positioned within the rear support between the rear tow bar and the damper.

9. The tow bar system of claim 8, wherein the front biasing mechanism is an extension spring, and the rear biasing mechanism is a compression spring.

10. The tow bar system of claim 1, further comprising a horizontal lockout assembly configured to lock out a lateral steering degree of freedom at the first or second end of the tow bar system.

11. A multi-vehicle control system (MVCS) for dynamic stability and control of a multi-vehicle system having a lead vehicle and a trailer vehicle each with independent propulsion and control, the MVCS comprising:

a tow bar system including:

a length sensing hitch having a first end configured to removably couple to a hitch of the lead vehicle, and an opposite second end configured to removably couple to a hitch of the trailer vehicle;

a free sliding bar disposed between the first and second ends and configured to allow extension and compression of the length sensing hitch during operation of the multi-vehicle system; and a length sensor operably associated with the free sliding bar to continuously sense a dynamic length of the tow bar system during operation of the multi-vehicle system; and a controller in signal communication with the lead vehicle and a trailer vehicle advanced driver assistance system (ADAS) or autonomous driving system, the controller programmed to:

continuously monitor and receive signals from the length sensor indicating the dynamic length of the tow bar system during operation of the multi-vehicle system;

determine an acceleration rate of change between the lead vehicle and the trailer vehicle based on the continuously sensed dynamic length of the tow bar system; and modify a throttle and a braking of the trailer vehicle, based on the received signals from the length sensor, to dynamically stabilize the multi-vehicle system.

12. A multi-vehicle control system (MVCS) for dynamic stability and control of a multi-vehicle system having a lead vehicle and a trailer vehicle each with independent propulsion and control, the MVCS comprising:

a tow bar system including:

a length sensing hitch having a first end configured to removably couple to a hitch of a lead vehicle, and an opposite second end configured to removably couple to a hitch of the trailer vehicle;

a free sliding bar disposed between the first and second ends and configured to allow extension and compression of the length sensing hitch; and a length sensor operably associated with the free sliding bar and configured to sense a length of the tow bar system; and a controller in signal communication with the lead vehicle and a trailer vehicle advanced driver assistance system (ADAS) or autonomous driving system, the controller programmed to:

monitor and receive signals from the length sensor indicating a length of the tow bar system; and modify a throttle and a braking of the trailer vehicle, based on the received signals from the length sensor, to dynamically stabilize the multi-vehicle system, wherein the controller is further programmed to determine an acceleration rate of change based on the received signals from the length sensor, wherein the controller determines the acceleration rate of change based on the sensed length of the tow bar system at three points in time.

13. The MVCS of claim 11, wherein the controller is further programmed to determine if the lead vehicle is accelerating or decelerating based on the received signals from the length sensor.

14. The MVCS of claim 13, wherein the controller is further programmed to determine if an acceleration or deceleration of the trailer vehicle matches the determined lead vehicle acceleration or deceleration.

15. The MVCS of claim 14, wherein the controller is further programmed to adjust a speed of the trailer vehicle if the acceleration or deceleration of the trailer vehicle does not match the determined lead vehicle acceleration or deceleration, to thereby match the trailer vehicle acceleration or deceleration to the lead vehicle acceleration or deceleration.

16. The MVCS of claim 14, wherein the controller is further programmed to maintain a speed and direction of the trailer vehicle if the acceleration or deceleration of the trailer vehicle matches the determined lead vehicle acceleration or deceleration.

17. The MVCS of claim 11, wherein the tow bar system further includes an angle sensor disposed on the first end and configured to sense an angle between the lead vehicle and the first end, wherein the angle sensor is in signal communication with the controller.

18. The MVCS of claim 11, wherein the tow bar system further includes an angle sensor disposed on the second end and configured to sense an angle between the trailer vehicle and the second end, wherein the angle sensor is in signal communication with the controller.

19. The MVCS of claim 11, wherein the tow bar system further includes a load cell configured to sense one or more forces on the tow bar system, wherein the load cell is in signal communication with the controller.

* * * * *